US010205550B2

(12) United States Patent
Muller et al.

(10) Patent No.: US 10,205,550 B2
(45) Date of Patent: Feb. 12, 2019

(54) SCALABLE, LOW-LATENCY MEDIUM-ACCESS CONTROL TECHNIQUE FOR OPTICALLY SWITCHED NETWORKS

(71) Applicant: Oracle International Corporation, Redwood Shores, CA (US)

(72) Inventors: Shimon Muller, Sunnyvale, CA (US); Ashok V. Krishnamoorthy, San Diego, CA (US); Leick D. Robinson, Austin, TX (US); Xuezhe Zheng, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/478,909

(22) Filed: Apr. 4, 2017

(65) Prior Publication Data

US 2018/0287729 A1    Oct. 4, 2018

(51) Int. Cl.
| | |
|---|---|
| *H04J 14/02* | (2006.01) |
| *H04L 12/933* | (2013.01) |
| *G02B 6/35* | (2006.01) |
| *G02B 6/293* | (2006.01) |
| *G02B 6/122* | (2006.01) |
| *H04Q 11/00* | (2006.01) |

(52) U.S. Cl.
CPC ........ *H04J 14/0212* (2013.01); *G02B 6/1225* (2013.01); *G02B 6/29382* (2013.01); *G02B 6/356* (2013.01); *G02B 6/3546* (2013.01); *H04L 49/15* (2013.01); *H04Q 11/0005* (2013.01)

(58) Field of Classification Search
CPC . H04J 14/0212; H04Q 11/0005; G02B 6/356; G02B 6/1225; G02B 6/3546; G02B 6/29382; H04L 49/15
See application file for complete search history.

(56) References Cited

U.S. PATENT DOCUMENTS

| | | | | |
|---|---|---|---|---|
| 5,101,290 A | * | 3/1992 | Eng ..................... | H04J 14/0227 370/463 |
| 2002/0154357 A1 | * | 10/2002 | Ozveren ............. | H04J 14/0201 398/85 |

(Continued)

*Primary Examiner* — Leslie Pascal
(74) *Attorney, Agent, or Firm* — Park, Vaughan, Fleming & Dowler LLP (57) ABSTRACT

An optically switched network system includes an optical switch with N inputs and N outputs that connects N end-nodes and is structured to transmit N wavelengths from each of the N inputs to each of the N outputs. The system includes a virtual data plane and a virtual control plane, which both communicate through the optical switch. The virtual data plane provides any-to-all parallel connectivity for data transmissions among the N end-nodes. The N end-nodes are partitioned into two or more subsets, wherein end-nodes in a given source subset transmit data to a given destination subset using wavelengths, which are not used by end-nodes outside of the given source subset to transmit data to the same given destination subset. The virtual control plane includes two or more rings associated with the two or more subsets of end-nodes. Each ring passes through a subset of end-nodes, and is used to communicate arbitration information among arbitration logic located at each end-node in the ring.

20 Claims, 10 Drawing Sheets
(5 of 10 Drawing Sheet(s) Filed in Color)

(56) References Cited

U.S. PATENT DOCUMENTS

2008/0131122 A1\* 6/2008 Reisslein ............ H04J 14/0227
398/59
2008/0232803 A1\* 9/2008 Maier ................ H04Q 11/0062
398/59

\* cited by examiner

SCALABLE, LOW-LATENCY MEDIUM-ACCESS CONTROL TECHNIQUE FOR OPTICALLY SWITCHED NETWORKS

GOVERNMENT LICENSE RIGHTS

This invention was made with U.S. government support under Agreement No. HR0011-08-9-0001 awarded by DARPA. The U.S. government has certain rights in the invention.

RELATED APPLICATION

The subject matter of this application is related to the subject matter in a co-pending U.S. patent application, entitled "Optically Switched Network Topology," by inventors Ashok V. Krishnamoorthy, Shimon Muller and Xuezhe Zheng, having Ser. No. 15/460,083, filed 15 Mar. 2017. The subject matter of this application is related to the subject matter in a co-pending U.S. patent application, entitled "Medium-Access Control Technique for Optically Switched Networks," by inventors Shimon Muller and Leick D. Robinson, having Ser. No. 15/478,948, and filed on the same day as the instant application.

BACKGROUND

Field

The disclosed embodiments generally relate to optical networks that facilitate high-performance communication among computing nodes, such as servers and storage devices. More specifically, the disclosed embodiments relate to the design of an optically switched network, which includes an optical control plane and an optical data plane.

Related Art

Enterprise computing systems typically comprise a large number of servers and storage devices interconnected by a high-performance network, which is responsible for communicating packets among the servers and storage devices. This high-performance network is typically implemented as a "switched network," which includes a central switch that is connected to each of the computing nodes through dedicated links. This switched network design enables a large number of computing nodes to simultaneously communicate with each other with minimal interference, thereby facilitating high-performance computing. In this type of switched network, arbitration decisions are performed by the central switch. This greatly complicates the design of the central switch, which also includes circuitry to implement interfaces for each of the computing nodes as well as a switching matrix.

As these high-performance networks increase in size, it is becoming increasingly harder to scale this type of central switch because the associated circuitry needs to increase in size, which makes it harder to incorporate the circuitry into the semiconductor chips, which are used to implement the central switch. The increasing density of the circuitry in these semiconductor chips also causes thermal-management issues, which can give rise to "hot spots" during system operation.

Hence, what is needed is a design for a high-performance network, which can scale to accommodate a large number of computing nodes without the above-described problems of existing network designs.

SUMMARY

The disclosed embodiments also provide a system that implements an optically switched network. This system includes an optical switch with N inputs and N outputs that connects N end-nodes, wherein the optical switch is structured to transmit N−1 wavelengths from each of the N inputs to each of the N−1 other outputs. The optically switched network is organized into a virtual data plane and a virtual control plane, which both communicate through the optical switch. The virtual data plane provides any-to-all parallel connectivity for data transmissions among the N end-nodes. Moreover, the N end-nodes are partitioned into two or more subsets, wherein end-nodes in a given source subset transmit data to a given destination subset using wavelengths which are not used by end-nodes outside of the given source subset to transmit data to the same given destination subset. (Note that the wavelengths in this subset of wavelengths all fall within the same "wavelength bucket." Also, note that this subset of wavelengths can be used by wavelengths outside of the given source subset to transmit data to other destination subsets.) The virtual control plane is organized as two or more rings, which are associated with the two or more subsets of end-nodes, wherein each ring passes through an associated subset of end-nodes, and is used to communicate arbitration information among distributed-arbitration logic located at each end-node in the ring. (Note that in the specification and the appended claims, whenever we refer to communications "from each of the N inputs to each of the N−1 other outputs," we also mean to cover communications "from each of the N inputs to each of the N other outputs," in which case an end-node can use a wavelength to send to itself via the optical switch, or for the case where there is not a one-to-one association between the N input end-nodes and the N output end-nodes.)

In some embodiments, the virtual control plane uses one or more reserved control wavelengths $\lambda_c$ to communicate the arbitration information through consecutive end-nodes in each ring.

In some embodiments, the virtual data plane uses N−1 data wavelengths, which are different from the one or more reserved control wavelengths $\lambda_c$ for the rings, to provide any-to-all parallel connectivity for data transmissions among the N end-nodes.

In some embodiments, there exist two subsets of the N end-nodes, a first end-node subset comprising even end-nodes $N_0, N_2, \ldots, N_{N-2}$, and a second end-node subset comprising odd end-nodes $N_1, N_3, \ldots, N_{N-1}$. There also exist two subsets of the N−1 wavelengths, a first wavelength subset $\lambda_1, \lambda_2, \ldots, \lambda_{N/2-1}$, and a second wavelength subset $\lambda_{N/2}, \lambda_{N/2+1}, \ldots, \lambda_{N-1}$. End-nodes in the first end-node subset $N_0, N_2, \ldots, N_{N-2}$ transmit to other end-nodes in the first end-node subset $N_0, N_2, \ldots, N_{N-2}$ using wavelengths from the first wavelength subset $\lambda_1, \lambda_2, \ldots, \lambda_{N/2-1}$, and transmit to end-nodes in the second end-node subset $N_1, N_3, \ldots, N_{N-1}$ using wavelengths from the second wavelength subset $\lambda_{N/2}, \lambda_{N/2+1}, \ldots, \lambda_{N-1}$. Moreover, end-nodes in the second end-node subset $N_1, N_3, N_{N-1}$ transmit to end-nodes in the first end-node subset $N_0, N_2, \ldots, N_{N-2}$ using wavelengths from the second wavelength subset $\lambda_{N/2}, \lambda_{N/2+1}, \ldots, \lambda_{N-1}$, and transmit to other end-nodes in the second end-node subset $N_1, N_3, \ldots, N_{N-1}$ using wavelengths from the first wavelength subset $\lambda_1, \lambda_2, \ldots, \lambda_{N/2-1}$.

In some embodiments, each of the N end-nodes is structured to transmit on the virtual control plane simultaneously with transmitting on the virtual data plane, and each of the N end-nodes is structured to receive on the virtual control plane simultaneously with receiving two or more wavelengths on the virtual data plane, with each data plane wavelength belonging to a different wavelength subset.

In some embodiments, the distributed-arbitration logic at each of the N end-nodes decides independently when and where to transmit data.

In some embodiments, each of the N end-nodes maintains packet-queuing data structures for storing packets to be transmitted across the optically switched network.

In some embodiments, the virtual control plane uses a token to communicate the arbitration information between consecutive end-nodes in each ring.

In some embodiments, the optical switch comprises a wavelength-division multiplexing (WDM) switch.

In some embodiments, each of the N end-nodes includes a fast-tunable laser to facilitate transmissions from the end-node.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

This disclosure presents a new architecture for an optically switched network and an associated distributed medium-access arbitration technique, which is designed for optical packet-switched networks. The intent of, and the motivation behind, the architecture and arbitration technique described herein is to take advantage of current and emerging state-of-the-art optical technologies to build a practical switch fabric that primarily relies on optical-only switching, while maintaining comparable-to-electronic switching performance levels but with lower costs and power consumption.

Before describing this new architecture and associated medium-access technique, we first describe an exemplary data center in which this type of optically switched network can operate.

Data Center

Figure 1:
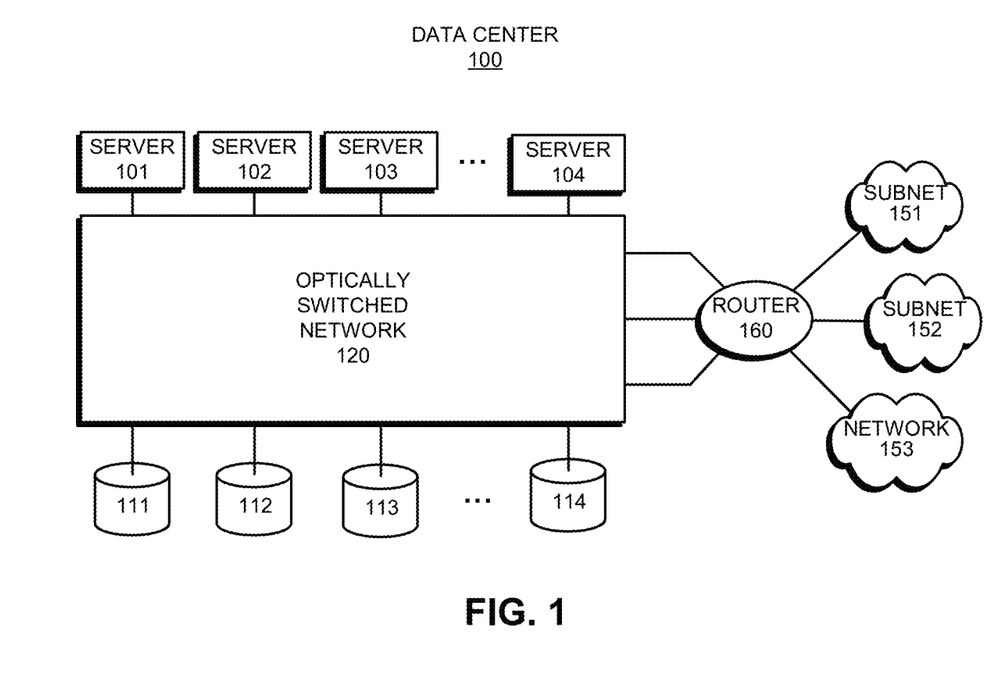
FIG. 1 illustrates an exemplary data center with an optical network in accordance with the disclosed embodiments.

FIG. 1 illustrates an exemplary data center 100, which includes an optically switched network 120 in accordance with the disclosed embodiments. As illustrated in FIG. 1, data center 100 comprises an optically switched network 120, which connects various end-nodes, including servers 101-104, storages devices 111-114 and a router 160. Router 160 can be used to connect data center 100 to various subnets 151-152, and to an external network 153, such as the Internet. Note that a data center is only one possible application of the optically switched network described below. This optically switched network design can generally be used in different contexts to connect different types of end-nodes, and is not meant to be limited to data-center-based applications.

Optically Switched Network Architecture

Our optical switch is a passive device, which is comprised of N inputs and N outputs, with arrayed waveguide grating router (AWGR) components in between, which are used to steer traffic flows to their destinations. Each switch port is connected to an end-node through a fiber pair that carries N wavelengths ($\lambda_1, \ldots, \lambda_N$) in each direction. The wavelengths can be sourced by the end-nodes using fast-tunable lasers, one at a time, while AWGRs in the switch fabric steer these wavelengths to their dedicated destinations. This architecture provides any-to-any fabric connectivity, which is controlled by the sending end-nodes' use of distinct wavelengths for given destinations. This ensures that the only point of network contention will arise at the output ports, and only in many-to-one traffic patterns.

The physical connectivity of the network is organized in a star topology, with N end-nodes connected to an optical switch in the center. The access technique is based on a distributed-arbitration scheme, wherein all of the intelligence resides at the end-nodes, while the design of the switching fabric itself is trivial. In other words, the sending end-nodes arbitrate for network access independently and in parallel, such that contention avoidance at the receiving destination end-nodes is guaranteed. This is accomplished by using two overlay networks over the same physically connected star topology: one for the data plane, and one for the control plane.

Data Plane

Figure 2A:
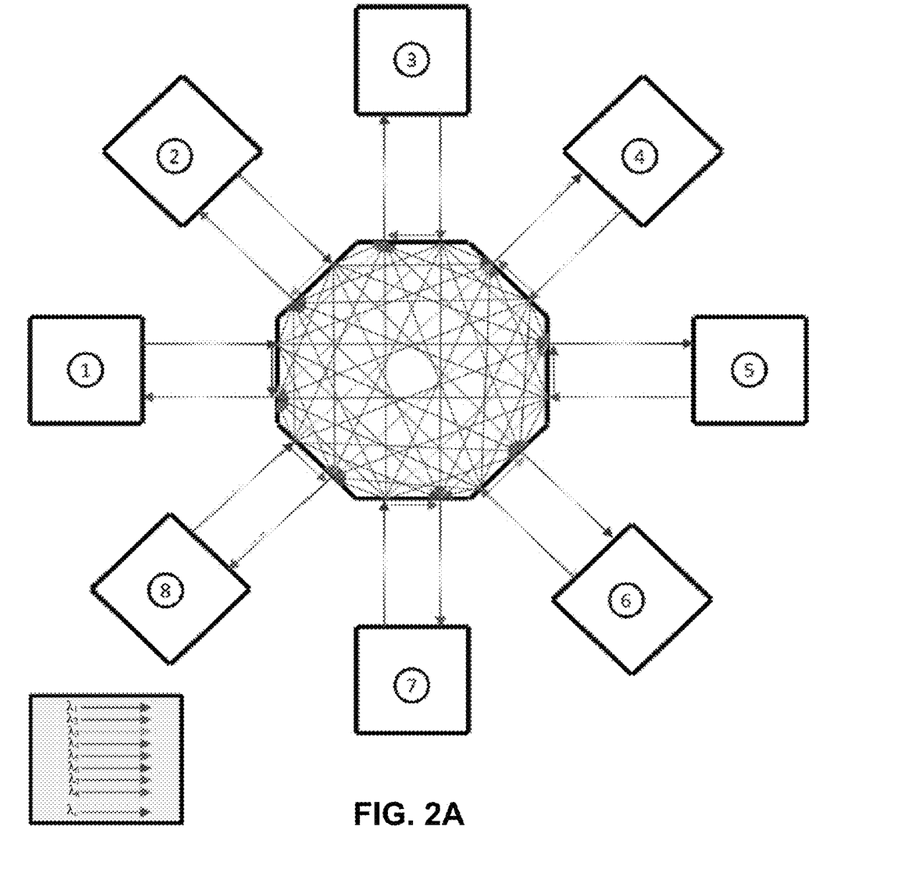
FIG. 2A illustrates a data plane for the optical network in accordance with an embodiment of the present disclosure.

For the data plane, the switching element at the center of the physical star topology provides any-to-all parallel connectivity among all of the end-nodes, thereby implementing a full mesh logical topology. An exemplary embodiment of this topology is illustrated in FIG. 2A, for an 8-node network.

Each source end-node maintains its own packet queuing data structures, such as Virtual Output Queues (VOQs), where at least one queue corresponds to each one of the output ports on the switch. Moreover, the switch's output port for a given packet is determined based on the packet's final destination mapping tables. To that extent, each end-node must have the knowledge of the overall network topology, and must be aware of the maximum supported radix of the switch it is connected to.

Also, each VOQ has a wavelength $\lambda_i$ assigned to it, based on the output port of the switch to which its traffic is targeted. Note that the $\lambda_i$-to-VOQ assignment is different for each source end-node, and the $\lambda_i$ routing in the switch is different for each destination end-node, wherein the assignment uses the following mapping:

For $\lambda_i$: $n=(m+i) \bmod N$; $1 \leq i \leq N-1$;
N is the switch radix
m is the source port of the switch
n is the destination port of the switch Each source end-node can transmit N−1 wavelengths, one at a time, using a tunable laser. The input port in the switch can steer the N−1 wavelengths $\lambda_i$ to the appropriate destination ports following the above mapping. Moreover, each destination end-node can receive N−1 wavelengths $\lambda_{ij}$, one at a time, where $\lambda_{ij}$ denotes $\lambda_i$ received from source j.

Control Plane

Figure 2B:
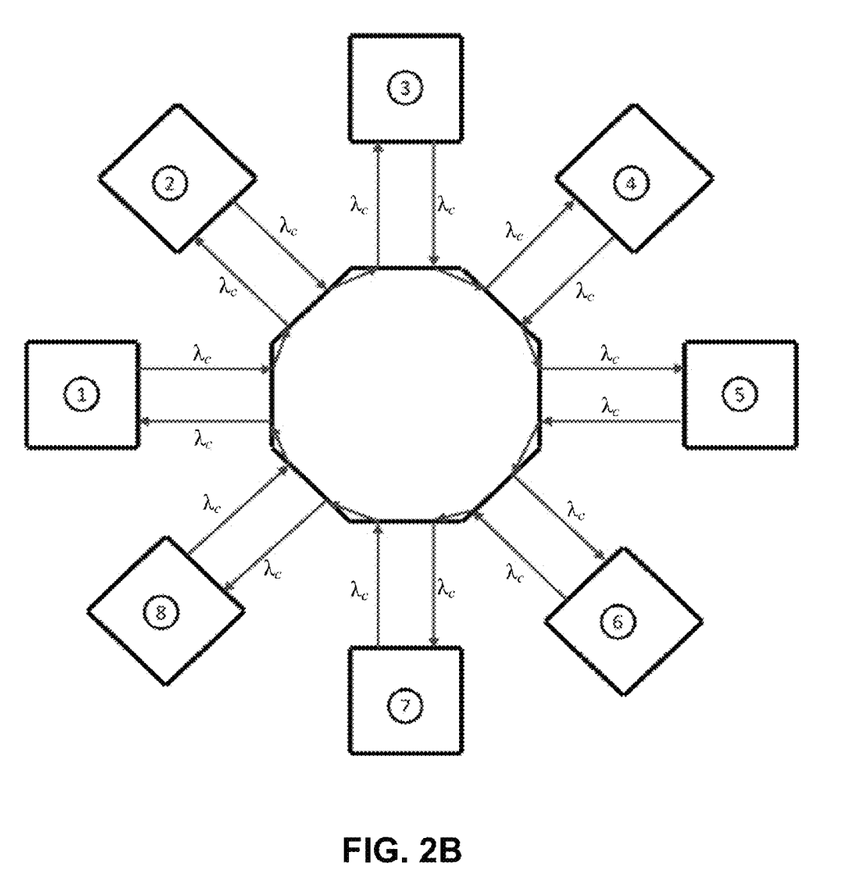
FIG. 2B illustrates a control plane for the optical network in accordance with an embodiment of the present disclosure.

For the control plane, the switching element at the center of the physical star topology provides point-to-point connectivity between consecutive end-nodes, to create a ring-structured logical topology. This is illustrated in FIG. 2B, for an 8-node network. Each end-node can send a control wavelength $\lambda_c$ at any time, including simultaneously with a data wavelength $\lambda_i$, which implies the use of a two-wavelength WDM transmission scheme. The switch fabric always steers $\lambda_c$ to the next consecutive active port on the switch: from port k to port k+1, unless k+1 is down, in which case it would be steered to k+2, etc. Finally, port N steers $\lambda_c$ to port 1, thereby closing the ring. Finally, $\lambda_c$ can be received at any time by an end-node, including simultaneously with a data wavelength $\lambda_i$, which again implies the use of a two-wavelength WDM transmission scheme. Note that the control wavelength $\lambda_c$ can (but does not have to) be the same for all the end-nodes, as long as the ring topology is implemented as described above.

Distributed-Arbitration Concepts

The scope of the arbitration technique described herein is limited to a single switch element of N ports. To that extent, each end-node that is connected to a switch must have the knowledge of the maximum supported radix of the switch. The assumption here is that network scalability, which requires multiple switch stages is accomplished using "gateway ports" for the inter-switch links. These ports are expected to provide electronic means (buffering, etc.), in addition to the purely optical switching described here. Furthermore, from a network medium-access standpoint, their behavior is identical to that of an end-node.

The distributed nature of the arbitration technique described herein requires that each end-node transmitter independently decide when and to whom to transmit, while guaranteeing that there is no wavelength contention at any of the output ports in the switch. To accomplish this, each end-node must maintain an up-to-date view of the transmission state of all the end-nodes in the entire switch fabric. This is achieved by having each end-node advertise to the entire network the destination port that it is currently sending to, if any, and propagating the network's transmission state from its upstream end-node to its downstream end-node in the control plane.

This medium-access protocol is based on the concepts described in the following sections.

Control Token

The end-nodes' transmission state is propagated across the fabric using control tokens, which are sent and received using a "control wavelength" $\lambda_c$ over the control plane. The purpose of the control token is twofold: (1) to propagate the latest fabric availability state as described above; and (2) to serve as a synchronization event that allows for deterministic, contention-free and independent arbitration at the end-nodes.

Because the control token is the only mechanism that triggers arbitration events at the end-nodes, in order to minimize latency and maximize throughput, it is desirable that it move around the control plane ring as fast as possible. Ideally, the token rotation time (TRT) should be primarily a function of the propagation delay of the active fiber links in the fabric's physical topology, with each end-node contributing a minimal delay that does not exceed $T_{Dmax}$.

Privileged End-Node (Anchor)

At any given time, one of the end-nodes in the fabric is defined to be an "anchor." The end-node's anchor status is temporary and it lasts until the end-node has an opportunity to send its data to its most-desired destination. After the end-node is done sending the data to that particular destination (either all data sent or timer-limited), it passes the anchor to the next downstream end-node. If an end-node has no data to send, it passes the anchor right away. The purpose of the anchor state is to ensure that no source end-node is permanently locked out from reaching any destination. In a sense, an anchor end-node is a high-priority, privileged end-node that all the other end-nodes will defer to for a limited period of time. To limit this amount of time, and to guarantee that the anchor can send its high-priority data to its desired destination deterministically, it employs a yield request broadcast message that is sent to all the other end-nodes on the network.

Control Message Format

The control token message is comprised of (at least) the following fields.

DestinationBusy—An N-bit field that identifies "busy" and "free" destinations. The source end-nodes use this field to independently decide whether they can initiate a new data transmission to a given destination. An end-node that starts a new data transmission to a destination port flips the bit that corresponds to that destination from "0" to "1" before forwarding the token to its downstream end-node. When the transmission is complete, the source-node flips the same bit back from "1" to "0" during the next token arrival. Note that a fabric that is 100% utilized, wherein all the inputs and outputs are perfectly paired-up and are continuously sending traffic, will have all the bits in this field set to "1." On the other hand, when no data is being sent over the network, this field will have all the bits cleared to "0."

Anchor—A $\log_2(N)$-bit field that identifies the anchor end-node, as described above. If a source end-node has any data to send when a token arrives, it will "acquire" the anchor by propagating this field unmodified. Otherwise, it will "pass" the anchor to the next end-node downstream by updating this field with the downstream end-node's ID.

AnchorYieldReq—This $\log_2(N)+1$ bit field indicates the destination that the current anchor is requesting from all the source end-nodes to free up, with one value being reserved to indicate "none." The anchor sets this field to its "most preferred" (or highest priority) destination when it acquires the anchor while that destination is already served by another source. In response to the AnchorYieldReq, the anchor expects to receive either a yield acknowledgment, or a cleared corresponding bit in the DestinationBusy field in the next received token. Otherwise, it assumes that an error has occurred.

AnchorYieldAck—This $\log_2(N)+1$ bit field indicates the source that is currently sending to the destination that an anchor is requesting to yield, with one value being reserved for "none." A source will set this field in response to an anchor's yield request if it cannot immediately cease transmission (e.g., it is in the middle of transmitting a packet).

Arbitration Actions

Arbitration actions at the end-nodes are triggered by the receipt of the token from an upstream end-node. Upon receipt of a token, an end-node saves the latest transmission state of the network, updates relevant token fields (as described below), and then immediately passes on the token to the downstream end-node. This is followed by the actual arbitration actions, as determined by the latest state received and the transmission requirements of an end-node.

Updating Token Fields

DestinationBusy Field—
IF this end-node is currently sending to a destination
It ensures that the bit that corresponds to that destination is set to "1" with all the other bits unchanged
ELSE IF it is not currently sending, BUT is about to start sending to a destination (has data to send, AND destination is free, AND Anchor is not waiting for it)
It ensures that the bit that corresponds to that destination is set to "1" with all the other bits unchanged
ELSE IF it is not currently sending, AND it was not sending on the previous token update, AND it cannot send to any destination (either it has nothing to send or all "desired" destinations are busy)
It passes on this field downstream unchanged
ELSE IF it is not currently sending, BUT it was sending to a destination on the previous token update
It ensures that the bit that corresponds to the destination is cleared to "0" with all the other bits unchanged Anchor Field—
IF this field corresponds to this end-node's ID, BUT the end-node has nothing to send, OR this end-node's Maximum Anchor Time ($T_{Anch-max}$) has expired
This field is updated with the ID of the next downstream end-node
ELSE
This field is passed on to the next downstream end-node unchanged.

AnchorYieldReq Field—This field is only modified by an anchor end-node. It is set to a destination end-node ID that the anchor wants to be freed after it becomes the anchor. It is set back to "none" when the bit in the DestinationBusy field that corresponds to the requested destination is received as cleared to "0." In between these two events, the anchor expects to see an AnchorYieldAck value that is not set to "none."

AnchorYieldAck Field—This field is forced by an end-node to its own ID if it is currently sending to the destination that the anchor is requesting to be freed, as indicated by the value in the AnchorYieldReq field. It continues to do so for as long as this state persists. Otherwise, it passes on this field to the downstream end-node unchanged. The anchor will set this field back to "none" at the same time as the AnchorYieldReq field.

Transmission Initiation, Cessation and Reservation

The network-access arbitration technique described herein allows for balancing (application-dependent) fairness versus efficiency trade-offs of network behavior by supporting two co-existing arbitration schemes for medium access:

Send-to-One Mode—This mode of operation is primarily intended for a bulk data transfer style of connectivity, wherein a sending end-node selects a single destination and sticks with it for a long period of time, ideally until the entire bulk of data has been transferred. It provides efficiency by eliminating the overhead of multiple arbitration attempts to the same destination during the data transfer. However, it introduces unfairness by potentially locking out other source end-nodes that might compete for the same destination. This shortcoming is addressed by bounding the end-node's transmission time to a maximum value, as determined by the $B_{burst}$ parameter (in bytes, typically a very large number).

Send-to-Many Mode—This mode of operation allows the sending end-node to transmit a relatively short burst of packets to multiple destinations that have been reserved in advance. The total amount of data that an end-node will send to all the reserved destinations at a single transmission opportunity shall not exceed the value defined by the $B_{res}$ parameter (in bytes, less than TRT). This mode improves the overall network efficiency by eliminating the overhead of multiple arbitration attempts to different destinations when the traffic patterns are such that a sender needs to talk to multiple destinations using data transfers that are shorter than the TRT. Note that this efficiency improvement does not affect arbitration fairness.

Note that the two modes described above can co-exist without affecting each other's behavior, and their selection is entirely under the control of the sending end-nodes that can employ their own internal policies at each network arbitration opportunity (i.e., the receipt of a token). These policies can be proprietary and different for each end-node, as long as the end-node's behavior on the network complies with the following rules:

(1) The first transmission after an idle period to one or more destinations is initiated by an end-node after a token's arrival by setting the corresponding destination "busy" bit(s), which is then followed by the actual data transmission in either the send-to-one or the send-to-many mode.

(2) An end-node that is already engaged in the transmission process, and is approaching the end of its transmission to a given destination (it is either running out of data to send to that particular destination or it is approaching $B_{burst}$), can "hide" its arbitration overhead and switch to a different destination without waiting for a token that follows its transmission cessation. Instead, it can perform the arbitration on the previous token arrival, using the following reservation process:

If upon receipt of a token, the amount of data remaining to be sent to the current destination is less than $B_{thr}$ (in bytes, less than TRT), the end-node is allowed to reserve one or more additional destinations (assuming that they are currently free, the anchor is not waiting for them and it has data queued up for them), by setting their corresponding "busy" bits.

After completing the transmission to the current destination, the end-node will switch to the following destination(s), one after the other, without waiting for a token. When the token does arrive, its fields are updated with the latest state accordingly.

If the above-mentioned reservation process was performed for one destination only (send-to-one), its transmission duration is subject to the $B_{burst}$ limitation as described earlier. Prior to its completion ($B_{thr}$), another arbitration cycle can be pipelined repeating the above sequence.

If the abovementioned reservation process was performed for more than one destination (send-to-many), its transmission duration is subject to the $B_{res}$ limit.

Once the currently reserved transmission(s) are terminated (either after $B_{res}$ or $B_{burst}$), the end-node waits for the next token and updates the corresponding "busy" bit(s). The end-node can resume transmission to the same destination(s) only upon receipt of the following token (at least one full TRT) and repeating the above process. However, it is allowed to schedule transmission(s) to new free destination(s) without waiting for the following token. These new transmissions can be either send-to-one or send-to-many.

Scalable Medium-Access Control Technique Based on Wavelength Buckets

For illustration purposes, we use the example of a 16-node system with two wavelength "buckets" at each receiver, wherein wavelengths 1-7 are in the first bucket, and wavelengths 8-15 are in the second bucket.

Figure 5A:
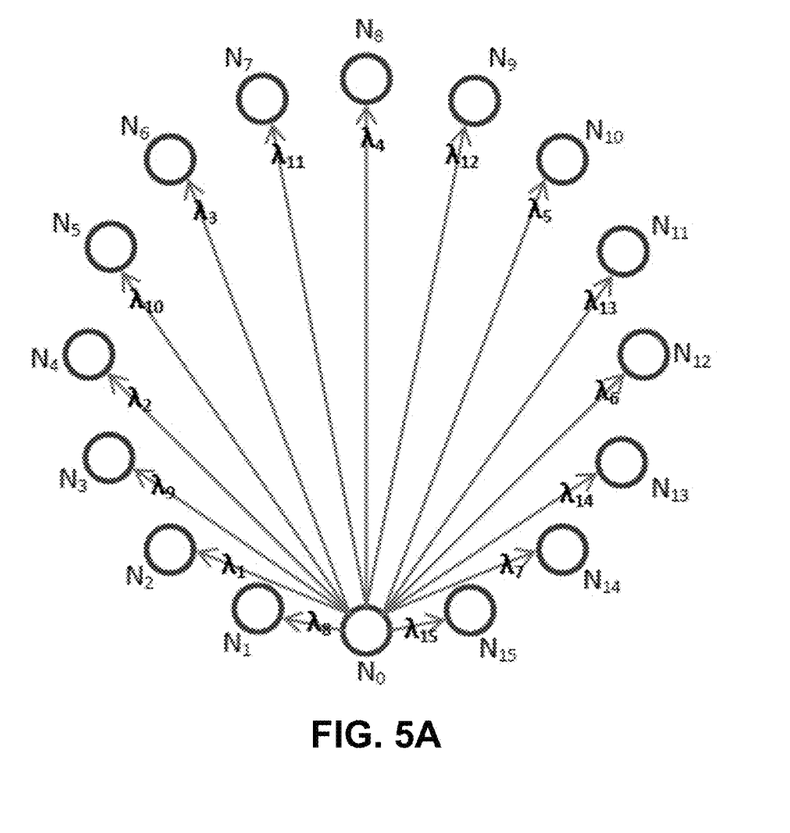
FIG. 5A illustrates how different wavelengths are used by a source end-node to communicate with different destination end-nodes in accordance with the disclosed embodiments.

The physical details of the specialized AWG design allows us to permute the wavelengths as follows. FIG. 5A depicts the wavelengths used by source end-node $N_0$. For end-node $N_0$, wavelengths $\lambda_1, \lambda_2, \ldots, \lambda_7$ are used to communicate with even destination end-nodes $N_2$, $N_4, N_6, \ldots, N_{14}$, and wavelengths $\lambda_8, \lambda_9, \ldots, \lambda_{15}$ are used to communicate with odd destination end-nodes $N_1$, $N_3, N_5, \ldots, N_{15}$.

The wavelengths used by each of the other source end-nodes can be obtained by just rotating this same wavelength connection pattern. So, in general, for source end-node $N_m$, wavelength $\lambda_i$ will connect to destination end-node $N_n$, where, $$n = \begin{cases} (m+2i) \bmod N, & 1 \leq i < \frac{N}{2} \\ \left(m + 2\left(i - \frac{N}{2}\right) + 1\right) \bmod N, & \frac{N}{2} \leq i < N \end{cases}$$

or alternatively $$i = \begin{cases} \frac{(n-m) \bmod N}{2}, & m+n \text{ even} \\ \frac{N}{2} + \frac{(n-m-1) \bmod N}{2}, & m+n \text{ odd} \end{cases}$$

Figure 5B:
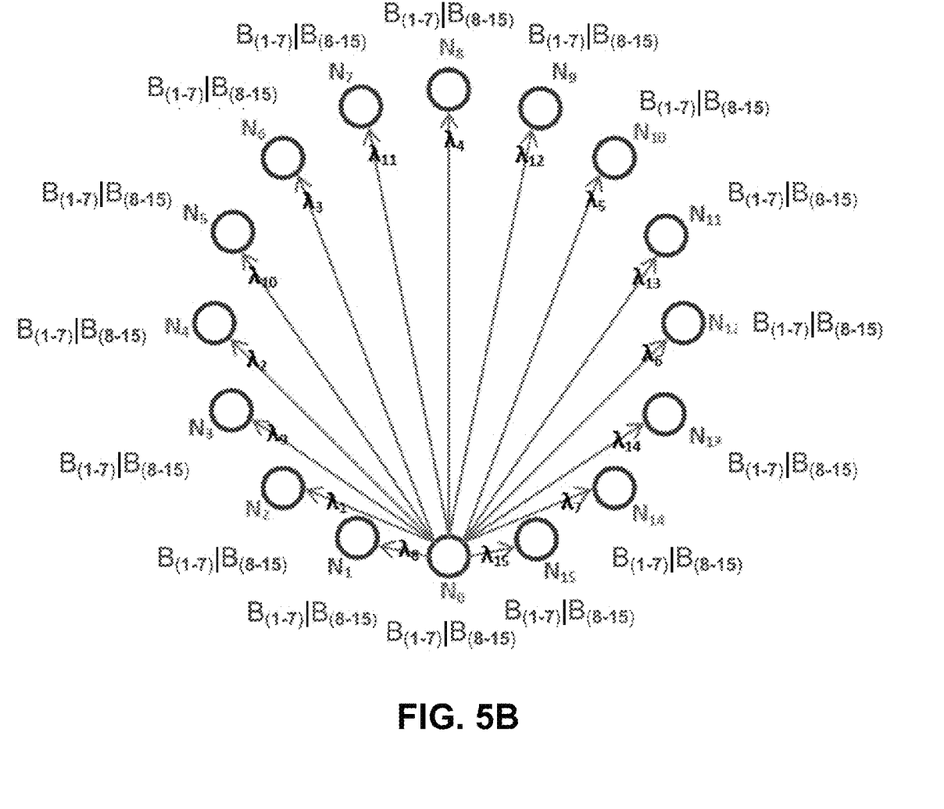
FIG. 5B illustrates how destination end-nodes in the optical network are associated with different wavelength buckets in accordance with the disclosed embodiments.

To see what we gain from this, refer to FIG. 5B where two receiver wavelength buckets are shown for each of the end-nodes. To illustrate the benefit, all of the end-nodes and buckets are colored, such that all of the even end-nodes are colored green and all of the odd end-nodes are colored red. The buckets are colored such that the first bucket, $B_{(1-7)}$, is green for even end-nodes and red for odd end-nodes, and the second bucket, $B_{(8-15)}$, is reversed, red for even end-nodes and green for odd end-nodes. This allows an end-node to simultaneously receive two data plane wavelengths: one in the green bucket and the other one in the red bucket. This implies the use of a three-wavelength WDM scheme in the receive optical domain. Note that green end-nodes only arbitrate for and send to green buckets, and red end-nodes only arbitrate for and send to red buckets.

Figure 5C:
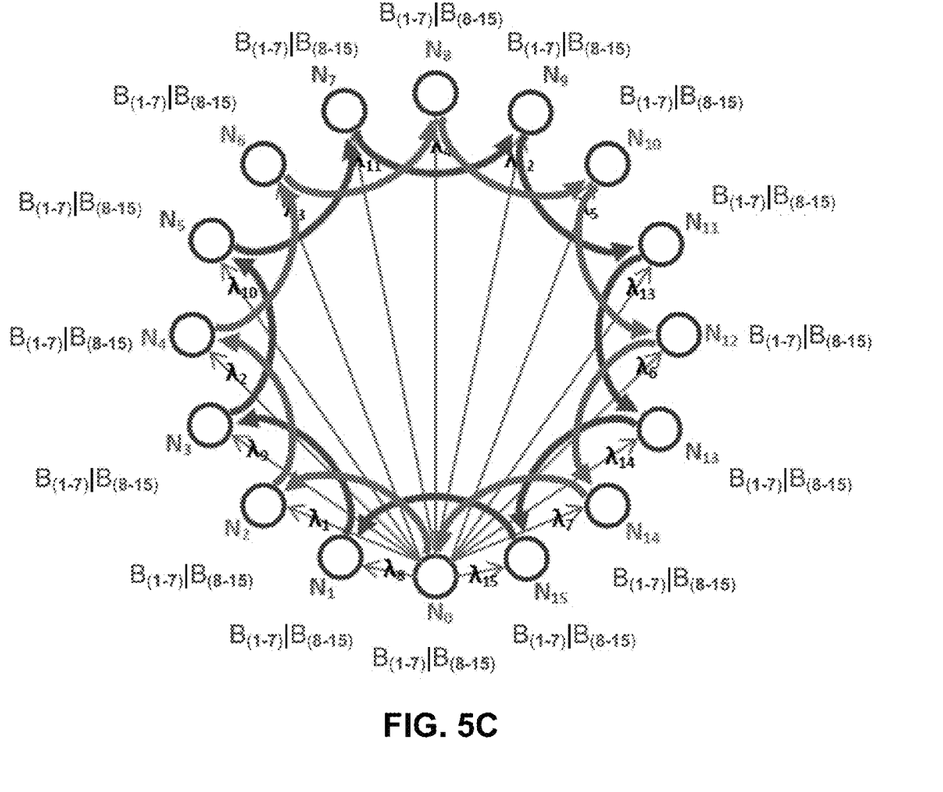
FIG. 5C illustrates how multiple tokens can be used in an optical network that associates destination end-nodes with different wavelength buckets in accordance with the disclosed embodiments.

This allows the control data plane to be split into two tokens: a green token that only needs to visit the green end-nodes, and a red token that only visits the red end-nodes, as is shown in FIG. 5C. In each token, the DestinationBusy field remains an N-bit field. In the green token, for instance, the DestinationBusy field identifies the busy/free state of the N green buckets, and likewise for the red token. Note that with this scheme, the token size has not increased, and the TRT has been halved, which reduces the worst case latency by 50%.

Also note that this scheme can easily be extended to four or more buckets. For four buckets, the TRT would be reduced to one fourth of its original value, because each token would only need to visit a quarter of the end-nodes, and so forth. Note that, in the extreme case, if we had N buckets, then each end-node would essentially be its own "color," so in this case, tokens would no longer be needed.

Control-Token Processing

Figure 3:
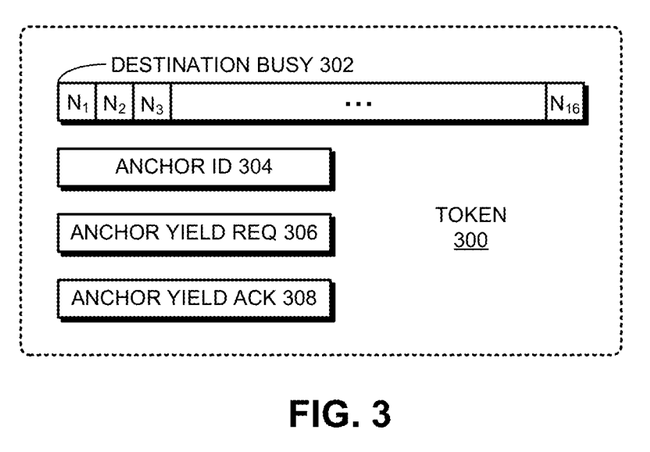
FIG. 3 illustrates the structure of a control token in accordance with an embodiment of the present disclosure.

FIG. 3 illustrates the structure of an exemplary control token 300 in accordance with the disclosed embodiments. Control token 300 includes a destination busy bit vector 302, which includes a busy bit (flag) for each possible destination end-node in the system. In the illustrated embodiment, there are 16 busy bits for each of 16 possible destination end-nodes in the system. The busy bit for a given destination end-node indicates whether or not a sending end-node has reserved the destination end-node. This prevents other end-nodes in the system from transmitting to the given destination end-node.

Control token 300 also includes various anchor-related fields, including: anchor ID field 304, anchor yield request field 306 and anchor yield acknowledgment field 308. Anchor ID field 304 contains the ID of an end-node that is presently the "anchor" in the ring and is entitled to reserve a destination end-node. Anchor yield request field 306 is filled in by the anchor with an ID of a desired destination end-node that the anchor would like to transmit to, but the busy bit for the desired destination end-node has been set by a sending end-node. In response to this anchor yield request field being filled in, the sending end-node fills in the anchor yield acknowledgment field 308 with its own ID. Then, during the next possible break in transmission, the sending end-node stops sending to the destination end-node and clears the busy bit for the destination end node, thereby relinquishing its reservation on the destination end-node. This process is described in more detail below with reference to the flow chart that appears in FIG. 4B.

Figure 4A:
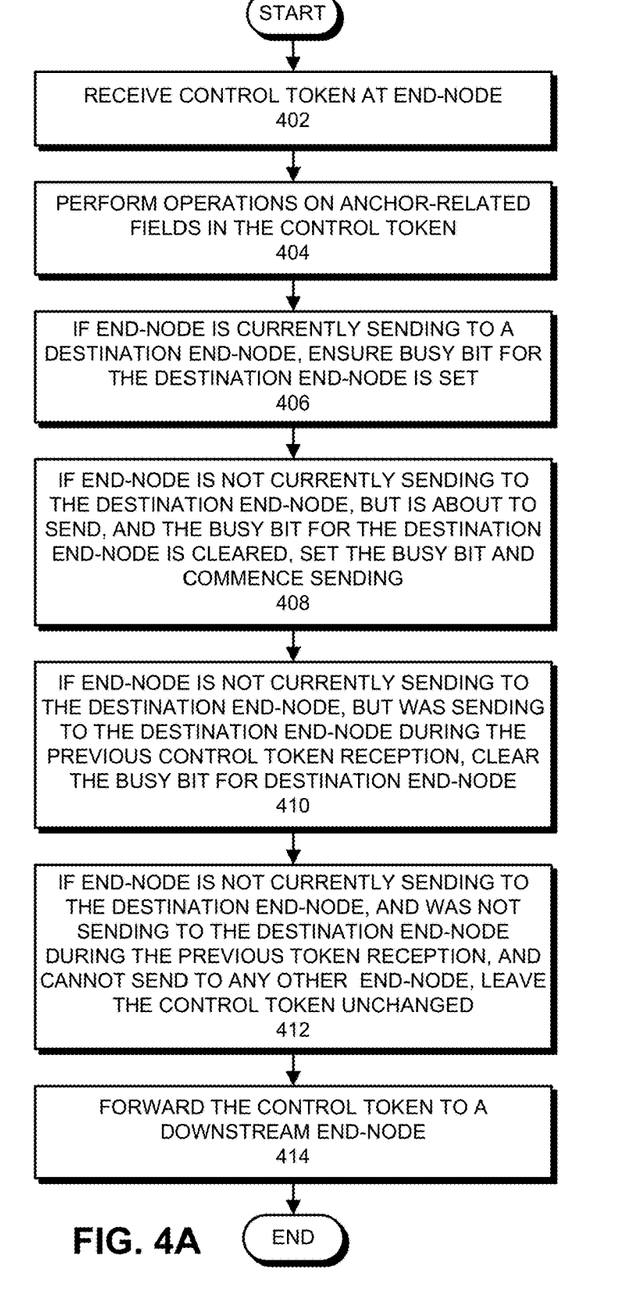
FIG. 4A presents a flow chart illustrating how a control token is processed in accordance with an embodiment of the present disclosure.

FIG. 4A presents a flow chart illustrating how a control token is processed in accordance with an embodiment of the present disclosure. At the start of this process, a control token is received at an end-node (step 402). Next, the system performs operations on anchor-related fields in the control token (step 404), which are described below with reference to the flow chart that appears in FIG. 4B. If the end-node is currently sending to a destination end-node, the system ensures the busy bit for the destination end-node is set (step 406). If the end-node is not currently sending to the destination end-node, but is about to send, and the busy bit for the destination end-node is cleared, the system sets the busy bit and commences sending (step 408). If the end-node is not currently sending to the destination end-node, but was sending to the destination end-node during the previous control token reception, the system clears the busy bit for the destination end-node (step 410). If the end-node is not currently sending to the destination end-node, and was not sending to the destination end-node during the previous control token reception, and cannot send to any other end-node, the system leaves the control token unchanged (step 412). Finally, the system forwards the control to a downstream end-node (step 414).

Figure 4B:
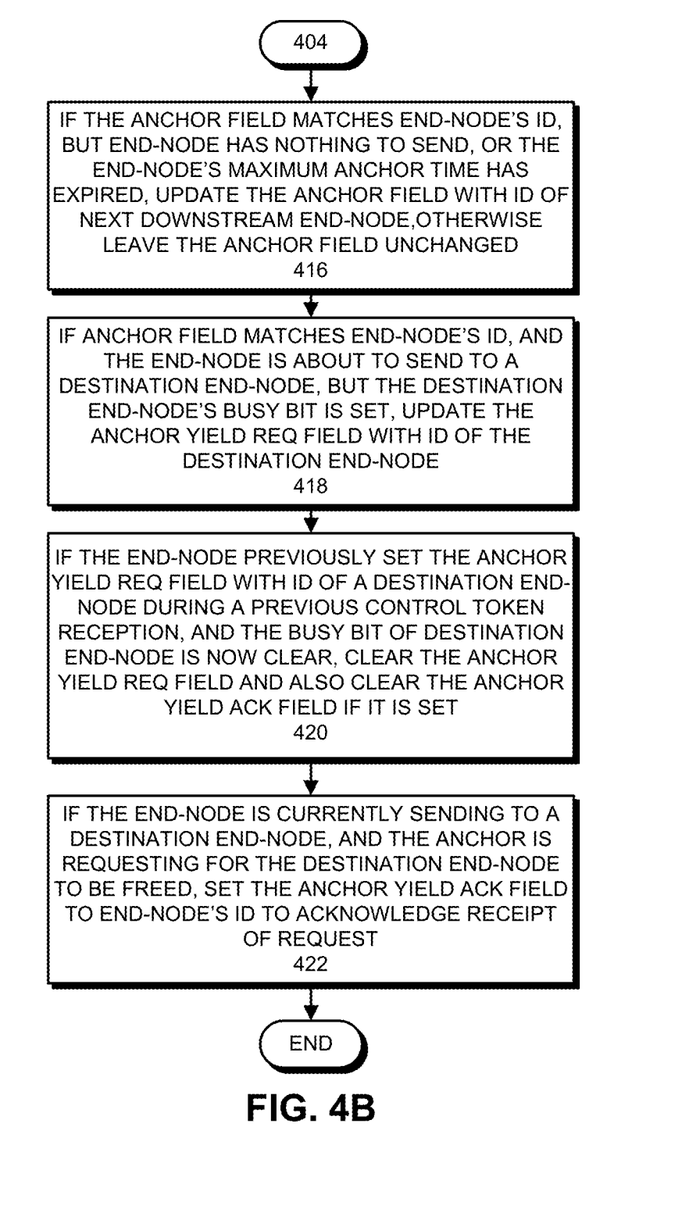
FIG. 4B presents a flow chart illustrating how anchor-related fields in the control token are processed in accordance with an embodiment of the present disclosure.

FIG. 4B presents a flow chart illustrating how anchor-related fields in the control token are processed in accordance with an embodiment of the present disclosure. If the anchor field matches the end-node's ID, but the end-node has nothing to send, or the end-node's maximum anchor time has expired, the system updates the anchor field with the ID of the next downstream end-node, and otherwise leaves the anchor field unchanged (step 416). If the anchor field matches the end-node's ID, and the end-node is about to send to a destination end-node, but the destination end-node's busy bit is set, the system updates the anchor yield request field with the ID of the destination end-node (step 418). If the end-node previously set the anchor yield request field with the ID of a destination end-node during a previous control token reception, and the busy bit of the destination end-node is now clear, the system clears the anchor yield request field and also clears the anchor yield acknowledgment field if it is set (step 420). If the end-node is currently sending to a destination end-node, and the anchor is requesting for the destination end-node to be freed, the system sets the anchor yield acknowledgment field to the end-node's ID to acknowledge receipt of the request (step 422).

Figure 4C:
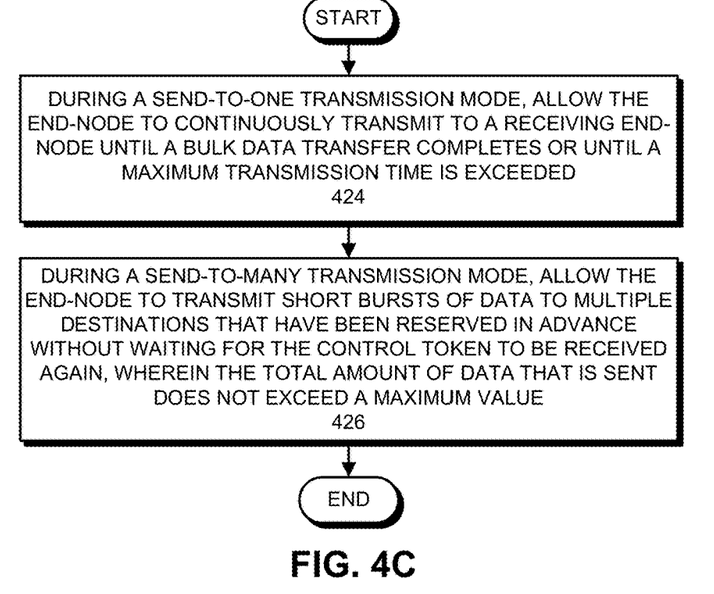
FIG. 4C presents a flow chart illustrating different transmission modes in accordance with an embodiment of the present disclosure.

FIG. 4C presents a flow chart illustrating different transmission modes in accordance with an embodiment of the present disclosure. During a send-to-one transmission mode, the system allows the end-node to continuously transmit to a receiving end-node until a bulk data transfer completes or until a maximum transmission time is exceeded (step 424). During a send-to-many transmission mode, the system allows the end-node to transmit short bursts of data to multiple destinations that have been reserved in advance without waiting for the token to be received again, wherein the total amount of data that is sent does not exceed a maximum value (step 426).

Figure 4D:
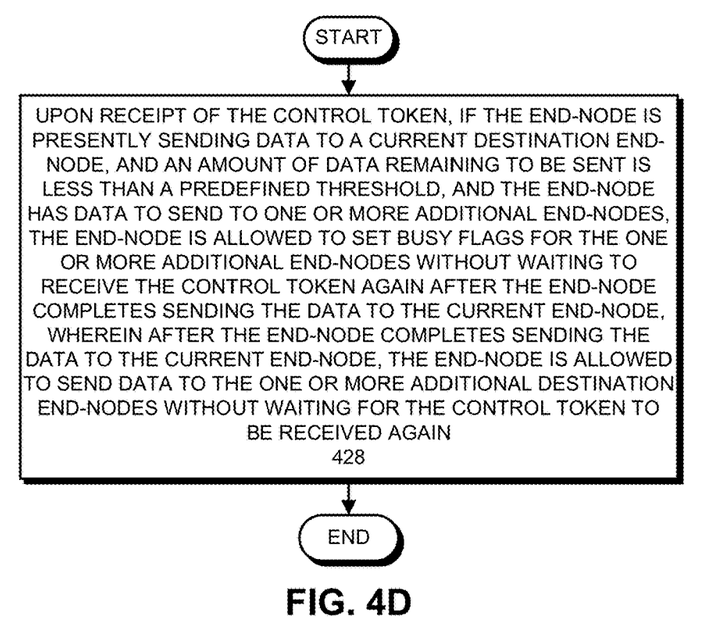
FIG. 4D presents a flow chart illustrating pipelining of the arbitration process in accordance with an embodiment of the present disclosure.

FIG. 4D presents a flow chart illustrating pipelining of the arbitration process in accordance with an embodiment of the present disclosure. Upon receipt of the control token, if the end-node is presently sending data to a current destination end-node, and an amount of data remaining to be sent is less than a predefined threshold, and the end-node has data to send to one or more additional end-nodes, the end-node is allowed to set busy flags for the one or more additional end-nodes without waiting to receive the control token again after the end-node completes sending the data to the current end-node, wherein after the end-node completes sending the data to the current end-node, the end-node is allowed to send data to the one or more additional destination end-nodes without waiting for the control token to be received again (step 428).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An optically switched network, comprising:
    an optical switch with N inputs and N outputs that connects N end-nodes, wherein the optical switch is structured to transmit N wavelengths from each of the N inputs to each of the N outputs;
    wherein the optically switched network is organized into a virtual data plane and a virtual control plane, which both communicate through the optical switch;
    wherein the virtual data plane provides any-to-all parallel connectivity for data transmissions among the N end-nodes;
    wherein the N end-nodes are partitioned into two or more subsets, wherein end-nodes in a given source subset transmit data to a given destination subset using wavelengths, which are not used by end-nodes outside of the given source subset to transmit data to the same given destination subset; and
    wherein the virtual control plane is organized as two or more rings, which are associated with the two or more subsets of end-nodes, wherein each ring passes through an associated subset of end-nodes, and is used to communicate arbitration information among distributed-arbitration logic located at each end-node in the ring.

2. The optically switched network of claim 1, wherein the virtual control plane uses one or more reserved control wavelengths $\lambda_c$, to communicate the arbitration information through consecutive end-nodes in each ring.

3. The optically switched network of claim 1, wherein the virtual data plane uses N−1 data wavelengths $\lambda_i$ which are different from one or more reserved control wavelengths $\lambda_c$, for the rings, to provide any-to-all parallel connectivity for data transmissions among the N end-nodes.

4. The optically switched network of claim 3,
    wherein there exist two subsets of the N end-nodes, a first end-node subset comprising even end-nodes $N_0, N_2, \ldots, N_{N-2}$, and a second end-node subset comprising odd end-nodes $N_1, N_3, \ldots N_{N-1}$;
    wherein there exist two subsets of the N−1 wavelengths, a first wavelength subset $\lambda_1, \lambda_2, \ldots, \lambda_{N/2-1}$, and a second wavelength subset $\lambda_{N/2}, \lambda_{N/2+1}, \ldots, \lambda_{N-1}$;
    wherein end-nodes in the first end-node subset $N_0, N_2, \ldots, N_{N-2}$ transmit to other end-nodes in the first end-node subset $N_0, N_2, \ldots, N_{N-2}$ using wavelengths from the first wavelength subset $\lambda_1, \lambda_2, \ldots, \lambda_{N/2-1}$, and transmit to end-nodes in the second end-node subset $N_1, N_3, \ldots, N_{N-1}$ using wavelengths from the second wavelength subset $\lambda_{N/2}, \lambda_{N/2+1}, \ldots, \lambda_{N-1;\text{ and}}$ wherein end-nodes in the second end-node subset $N_1, N_3, \ldots, N_{N-1}$ transmit to end-nodes in the first end-node subset $N_0, N_2, \ldots, N_{N-2}$ using wavelengths from the second wavelength subset $\lambda_{N/2}, \lambda_{N/2+1}, \ldots, \lambda_{N-1}$, and transmit to other end-nodes in the second end-node subset $N_1, N_3, \ldots, N_{N-1}$ using wavelengths from the first wavelength subset $\lambda_1, \lambda_2, \ldots, \lambda_{N/2-1}$.

5. The optically switched network of claim 1,
wherein each of the N end-nodes is structured to transmit on the virtual control plane simultaneously with transmitting on the virtual data plane; and
wherein each of the N end-nodes is structured to receive on the virtual control plane simultaneously with receiving two or more wavelengths on the virtual data plane, with each data plane wavelength belonging to a different wavelength subset.

6. The optically switched network of claim 1, wherein the distributed-arbitration logic at each of the N end-nodes decides independently when and where to transmit data.

7. The optically switched network of claim 1, wherein each of the N end-nodes maintains packet-queuing data structures for storing packets to be transmitted across the optically switched network.

8. The optically switched network of claim 1, wherein the virtual control plane uses a token to communicate the arbitration information between consecutive end-nodes in each ring.

9. The optically switched network of claim 1, wherein the optical switch comprises a wavelength-division multiplexing (WDM) switch.

10. The optically switched network of claim 1, wherein each of the N end-nodes includes a fast-tunable laser to facilitate transmissions from the end-node.

11. An enterprise computer system, comprising:
a set of servers;
a set of storage devices; and
an optically switched network that facilitates communications among the set of servers and the set of storage devices, wherein the set of servers and the set of storage devices comprise end-nodes in the optically switched network, wherein the optically switched network includes:
an optical switch with N inputs and N outputs that connects N end-nodes, wherein the optical switch is structured to transmit N wavelengths from each of the N inputs to each of the N outputs;
wherein the optically switched network is organized into a virtual data plane and a virtual control plane, which both communicate through the optical switch;
wherein the virtual data plane provides any-to-all parallel connectivity for data transmissions among the N end-nodes;
wherein the N end-nodes are partitioned into two or more subsets, wherein end-nodes in a given source subset transmit data to a given destination subset using wavelengths, which are not used by end-nodes outside of the given source subset to transmit data to the same given destination subset; and
wherein the virtual control plane is organized as two or more rings, which are associated with the two or more subsets of end-nodes, wherein each ring passes through an associated subset of end-nodes, and is used to communicate arbitration information among distributed-arbitration logic located at each end-node in the ring.

12. The enterprise computer system of claim 11, wherein the virtual control plane uses one or more reserved control wavelengths $\lambda_c$, to communicate the arbitration information through consecutive end-nodes in each ring.

13. The enterprise computer system of claim 11, wherein the virtual data plane uses N-1 data wavelengths $\lambda_t$, which are different from the reserved control wavelengths $\lambda_c$ for the rings, to provide any-to-all parallel connectivity for data transmissions among the N end-nodes.

14. The enterprise computer system of claim 13,
wherein there exist two subsets of the N end-nodes, a first end-node subset comprising even end-nodes $N_0, N_2, \ldots, N_{N-2}$, and a second end-node subset comprising odd end-nodes $N_1, N_3, \ldots, N_{N-1}$;
wherein there exist two subsets of the N wavelengths, a first wavelength subset $\lambda_1, \lambda_2, \ldots, \lambda_{N/2-1}$, and a second wavelength subset $\lambda_{N/2}, \lambda_{N/2+1}, \ldots, \lambda_{N-1}$;
wherein end-nodes in the first end-node subset $N_0, N_2, \ldots, N_{N-2}$ transmit to other end-nodes in the first end-node subset $N_0, N_2, \ldots, N_{N-2}$ using wavelengths from the first wavelength subset $\lambda_1, \lambda_2, \ldots, \lambda_{N/2-1}$, and transmit to end-nodes in the second end-node subset $N_1, N_3, \ldots, N_{N-1}$ using wavelengths from the second wavelength subset $\lambda_{N/2}, \lambda_{N/2+1}, \ldots, \lambda_{N-1}$; and
wherein end-nodes in the second end-node subset $N_1, N_3, \ldots, N_{N-1}$ transmit to end-nodes in the first end-node subset $N_0, N_2, \ldots, N_{N-2}$ using wavelengths from the second wavelength subset $\lambda_{N/2}, \lambda_{N/2+1}, \ldots, \lambda_{N-1}$, and transmit to other end-nodes in the second end-node subset $N_1, N_3, \ldots, N_{N-1}$ using wavelengths from the first wavelength subset $\lambda_1, \lambda_2, \ldots, \lambda_{N/2-1}$.

15. The enterprise computer system of claim 11,
wherein each of the N end-nodes is structured to transmit on the virtual control plane simultaneously with transmitting on the virtual data plane; and
wherein each of the N end-nodes is structured to receive on the virtual control plane simultaneously with receiving two or more wavelengths on the virtual data plane, with each data plane wavelength belonging to a different wavelength subset.

16. The enterprise computer system of claim 11, wherein the distributed-arbitration logic at each of the N end-nodes decides independently when and where to transmit data.

17. The enterprise computer system of claim 11, wherein each of the N end-nodes maintains packet-queuing data structures for storing packets to be transmitted across the optically switched network.

18. The enterprise computer system of claim 11, wherein the virtual control plane uses a token to communicate the arbitration information between consecutive end-nodes in each ring.

19. The enterprise computer system of claim 11, wherein the optical switch comprises a wavelength-division multiplexing (WDM) switch.

20. A method for facilitating communications through an optically switched network, comprising:
operating the optically switched network, wherein the optically switched network comprises:
an optical switch with N inputs and N outputs that connects N end-nodes, wherein the optical switch is structured to transmit N wavelengths from each of the N inputs to each of the N outputs;
wherein the optically switched network is organized into a virtual data plane and a virtual control plane, which both communicate through the optical switch; and
while the optically switched network is operating:
using the virtual control plane to communicate arbitration information among distributed-arbitration logic located at each of the N end-nodes, wherein the virtual control plane is organized as two or more rings, which are associated with the two or more subsets of the N end-nodes, wherein each ring passes through an associated subset of end-nodes, and is used to communicate arbitration information among distributed-arbitration logic located at each end-node in the ring; and using the distributed-arbitration logic to coordinate data transmissions through the virtual data plane, wherein the virtual data plane is organized in a star topology that provides any-to-all parallel connectivity for data transmissions among the N end-nodes;

wherein during the data transmissions, end-nodes in a given source subset transmit data to a given destination subset using wavelengths, which are not used by end-nodes outside of the given source subset to transmit data to the same given destination subset.

\* \* \* \* \*

UNITED STATES PATENT AND TRADEMARK OFFICE
CERTIFICATE OF CORRECTION

| | |
|---|---|
| PATENT NO. | : 10,205,550 B2 |
| APPLICATION NO. | : 15/478909 |
| DATED | : February 12, 2019 |
| INVENTOR(S) | : Muller et al. |

It is certified that error appears in the above-identified patent and that said Letters Patent is hereby corrected as shown below:

In the Drawings

On sheet 6 of 10, in FIG. 4B, under Reference Numeral 416, Line 5, delete "NODE,OTHERWISE" and insert -- NODE, OTHERWISE --, therefor.

In the Specification

In Column 1, Line 17, delete "15/460,083,filed" and insert -- 15/460,083, filed --, therefor.

In Column 2, Line 54, delete "$N_1, N_3, N_{N-1}$" and insert -- $N_1, N_3,..., N_{N-1}$ --, therefor.

In the Claims

In Column 12, Line 46, in Claim 2, delete "$\lambda_c,$" and insert -- $\lambda_c$ --, therefor.

In Column 12, Line 49, in Claim 3, delete "$\lambda_i$which" and insert -- $\lambda_i$, which --, therefor.

In Column 12, Line 50, in Claim 3, delete "$\lambda_c,$" and insert -- $\lambda_c$ --, therefor.

In Column 12, Line 57, in Claim 4, delete ". $N_{N-1}$;" and insert -- ., $N_{N-1}$; --, therefor.

In Column 12, Line 60, in Claim 4, delete ".,$\lambda_{N-1}$;" and insert -- ., $\lambda_{N-1}$; --, therefor.

In Column 12, Line 64, in Claim 4, delete "$\lambda_1,\lambda_2,$" and insert -- $\lambda_1, \lambda_2,$ --, therefor.

In Column 12, Line 67, in Claim 4, delete ".,$\lambda_{N-1;\ and}$" and insert -- ., $\lambda_{N-1}$; and --, therefor.

In Column 13, Line 7, in Claim 4, delete ".,$\lambda_{N/2-1}.$" and insert -- ., $\lambda_{N/2-1}.$ --, therefor.

In Column 14, Line 1, in Claim 12, delete "$\lambda_c,$" and insert -- $\lambda_c$ --, therefor.

Signed and Sealed this
Eighteenth Day of February, 2020

Andrei Iancu
*Director of the United States Patent and Trademark Office*

CERTIFICATE OF CORRECTION (continued)
U.S. Pat. No. 10,205,550 B2

In Column 14, Lines 19-20, in Claim 14, delete "$\lambda_1, \lambda_2, \ldots, \lambda_{N/2-1},$" and insert -- $\lambda_1, \lambda_2, \ldots, \lambda_{N/2-1},$ --, therefor.

In Column 14, Line 27, in Claim 14, delete "$N_{N-1},$" and insert -- $\lambda_{N-1},$ --, therefor.